Oct. 20, 1970  SETURO KINBARA  3,535,645
PULSE INTEGRATING CIRCUIT SYSTEM
Original Filed March 24, 1964  2 Sheets-Sheet 1

United States Patent Office 3,535,645
Patented Oct. 20, 1970

3,535,645
PULSE INTEGRATING CIRCUIT SYSTEM
Seturo Kinbara, Ibaraki-ken, Japan, assignor to Nihon Genshiryoku Kenkyu Sho, Tokyo, Japan
Continuation of application Ser. No. 354,829, Mar. 24, 1964. This application Feb. 17, 1967, Ser. No. 633,640
Claims priority, application Japan, Apr. 6, 1963, 38/18,486
Int. Cl. G06g 7/18
U.S. Cl. 328—127
2 Claims

ABSTRACT OF THE DISCLOSURE

The pulse integrating system comprises integrating circuits for charging and discharging respectively. When pulses of one polarity are applied to the one circuit, its capacitor is charged integratingly and when pulses of another polarity are applied to the other circuit, its capacitor is charged integratingly in reverse polarity so that the capacitor of the integrating circuit for discharging is discharged.

CROSS-REFERENCE

This is a continuation of my copending application Ser. No. 354,829, filed Mar. 24, 1964, now abandoned.

BACKGROUND AND SUMMARY OF THE INVENTION

This invention relates to a pulse integrating circuit and, more particularly, a pulse integrating circuit in which a capacitor is charged by input pulses having any random form to a value proportional to the crest and the number of the input pulses and, thereafter the capacitance is discharged by periodic pulses having a constant amplitude and pulse interval whereby the input pulse is converted to a pulse having a different attitude from that of the input pulse.

In general, the amplitude and the interval of the pulses are frequently distributed in a wide range at random. When the random pulses are measured as a value proportional to the amplitude and the number of the input pulses in accordance with the pulse integrating circuit provided by the present application, the random input pulses are converted into pulses having a constant magnitude and occurring at a constant interval and, therefore, the random pulses are measured quite easily.

An object of the invention is to provide a pulse integrating circuit in which input pulses having a different form from that of the input pulses are converted into pulses having any random form in order to measure or calculate the input pulses by using the pulses then converted.

Another object of the invention is to provide a pulse integrating circuit in which charges and discharges are performed with pulsation having desired magnitudes and time intervals.

BRIEF DESCRIPTION OF DRAWING

The objects and advantages of this invention will become readily apparent from the following detailed description, in which.

DETAILED DESCRIPTION

Figure 1:
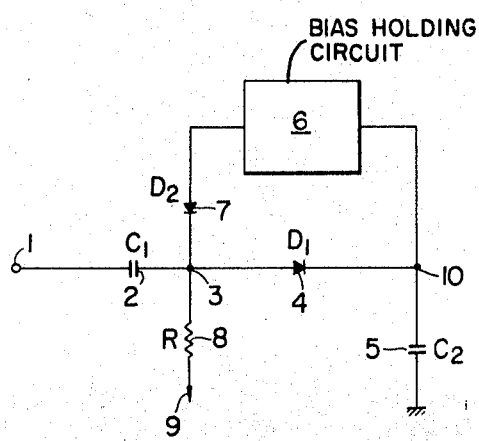
FIG. 1 is a schematic diagram of a well known basic integrating circuit.

In FIG. 1 a terminal 1 is connected to a junction 3 through a capacitance 2. Junction 3 is connected to the anode side of a diode 4, the cathode side of a diode 7 and a terminal of a resistance 8. The other terminal of resistance 8 is connected to a negative source 9. The cathode side of diode 4 is connected to a terminal of a capacitance 5, and the other terminal of capacitance 5 is grounded. The anode side of diode 7 is connected to a junction point 10 between diode 4 and capacitance 5 through a bias holding circuit 6. The bias holding circuit keeps the voltage at junction 3 at the same value as that at junction 10. Bias holding circuit 6 may comprise any of several known circuits capable of performing this function. For example, it may comprise an emitter-follower circuit of the type published in the Instruction Manual for the ADC Sweep Circuit No. ND 120, published by Nuclear Data, Inc., Palatine, Ill., or an operational amplifier circuit of the type disclosed in FIGS. 1.23($a$) to 1.23($d$) of the catalog published by Philbrick Researches, Inc., Needham, Mass.

The operation of the circuit shown in FIG. 1 is explained as follows: when a positive pulse is applied to terminal 1, the positive pulse passes through capacitance 2, junction 3 and diode 4, and capacitance 5 is charged to a value proportional to the pulse height of the input positive pulse. Since by means of bias holding circuit 6 the voltage at junction 3 is kept at the same value as the voltage of capacitance 5 prior to the application of the input positive pulse to terminal 1 and since diode 4 is biased at 0 potential, capacitance 5 can be charged to values proportional to the pulse height of the input positive pulse. Diode 7 is reversely biased against the input pulse and therefore is not effected by the input pulse. However, diode together with bias holding circuit 6 operates to keep the voltage of junction 3 the same as the voltage of capacitance 5 when the input pulses is removed so thta diode 4 is biased thereafter at 0 potential. Therefore, capacitance 5 is charged by the next input positive pulse without changing the proportion relative to the preceding input positive pulse.

Figure 2:
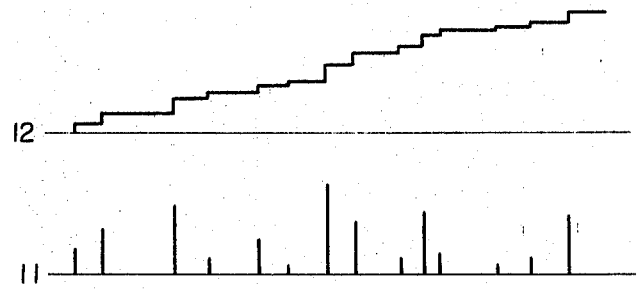
FIG. 2 shows the wave forms representative of the circuit shown in FIG. 1.

In FIG. 2, capacitance 5 is shown charged to a wave form 12 by the input positive pulses shown by wave forms 11.

If the electric charge accumulated on capacitor 5 is discharged by pulsating pulses having a constant magnitude and occurring at a constant interval, it is supposed that the train of input pulses is converted to a periodic pulse having constant amplitude corresponding to the integrated value of the amplitude of the input pulse by the number of the input pulses. This conversion is performed by providing an integrating circuit for discharging which has its input pulses of reverse polarity to said first input pulses so that the charge on capacitor 5 is discharged pulsatingly. As operational speed characteristic of one integrating circuit which receives pulses of one polarity is not symmetrical with that of the other integrating circuit which receives pulses of other polarity, the charge or discharge of one integrating circuit interferes with those of the other integrating circuit and the linearity of the integrating characteristics cannot be maintained.

Figure 3:
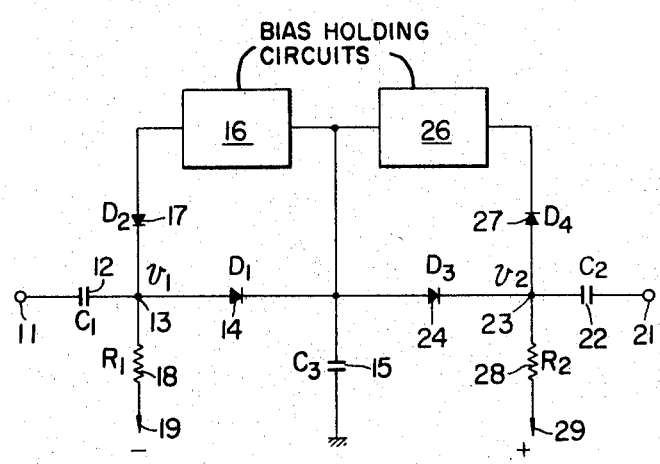
FIG. 3 is a schematic diagram showing the principle of the integrating circuit in which charges and discharges are performed.

In FIG. 3, a group consisting of a terminal 11, a capacitor 12, a junction 13, a diode 14, a capacitor 15, a bias holding circuit 16, a diode 17, a resistor 18 and a negative source 19 forms an integrating circuit for the positive pulse similar to the integrating circuit shown in FIG. 1 and another group consisting of a terminal 21, a capacitor 22, a junction 23, a diode 24, a capacitor 15, a bias holding circuit 26 having similar construction to that of circuit 6 in FIG. 1$a$, a diode 27, a resistance 28 and a positive source 29 forms an integrating circuit for the negative pulse similar to the integrating circuit shown in FIG. 1. The two groups are combined by the capacitance 15 in cascade.

The operation of the circuit shown in FIG. 3 is explained as follows: a positive input pulse is applied to terminal 11 and charges capacitor 15. As capacitance 15 is charged quickly and diode 24 is biased in the forward direction to pass the positive pulse, the electric charge on capacitor 15 does not become proportional to the input pulse. In order that diode 24 does not pass the input pulse, the voltage on junction 23 must change at the same rate as the change of the voltage on capacitance 15 changes, however this is difficult in the circuit shown. The response speed of junction 23 to the positive direction is limited by time constant $C_2R_2$ determined by capacitor 22 and resistor 28 and the voltage of positive source 29, where the value of capacitor 22 being designated as $C_2$ and the value of resistor 28 being designated as $R_2$. The response speed is smaller than the charging speed of capacitor 15 effected by the input pulse, so diode 24 passes the input pulse. Alternatively, in order that diode 24 does not pass the input pulse, the building up speed of the input pulse must be limited considerably.

The similar condition as that described above applies to the negative input pulse applied to terminal 21 and the integrating circuit on the charging side interferes with the integrating circuit on the discharging side.

In accordance with the present invention, taking into consideration the above-mentioned faults, the charging and discharging are performed by any pulse and at any time while completely maintaining the charging and discharging characteristics the same as those shown in the prior art without causing any interference between the two integrating circuits.

Figure 4:
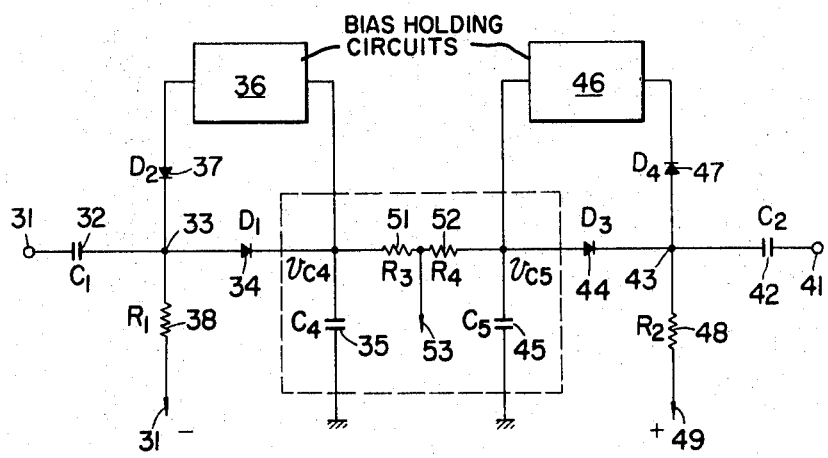
FIG. 4 is a schematic diagram of an integrating circuit provided in accordance with the invention.

In FIG. 4, a group consisting of a terminal 31, a capacitor 32, a junction 33, a diode 34, a capacitor 35, a bias holding circuit 36, a diode 37, a resistor 38 and a negative source 39 forms an integrating circuit for the positive pulse and another group consisting of a terminal 41, a capacitor 42, a junction 43, a diode 44, a capacitor 45, a bias holding circuit 46, a diode 47, a resistance 48 and a positive source 49 forms an integrating circuit for the negative pulse. The two integrating circuits are combined by resistors 51 and 52 at the ungrounded terminals of capacitance 35 and capacitance 45.

The operation of the circuit shown in FIG. 4 is explained as follows: a positive input pulse is applied to terminal 31 and charges capacitor 35. The voltage of junction 33 is kept the same as the voltage of capacitor 35 by means of bias holding circuit 36 and diode 37 and an integrating operation is performed. As the integrating circuit in the charging side is separated from the integrating circuit in the discharging side by resistances 51 and 52, the integrating circuit in the discharging side does not interfere in the input pulse in the charging side. The voltage of capacitor 35 is kept normally the same as the voltage of capacitor 45 and only capacitor 35 is charged at the instant when the input pulse is applied to the terminal 31. The voltage when capacitor 35 is charged is assumed $e_i$. Following the charging of capacitor 35, capacitor 45 is charged by capacitor 35 and the speed by which capacitor 45 is charged is limited by means of resistors 51 and 52 and the speed is slow.

The maximum $$\left(\frac{dv_{c5}}{dt}\right)_{max.}$$

of the changing rate by which capacitor 45 is charged is expressed by the following equation:

$$\left(\frac{dv_{c5}}{dt}\right)_{max.} = \frac{e_i}{(R_3+R_4)C_5} \qquad (1)$$

where $v_{c5}$=voltage across capacitor 45
$R_3$=value of resistor 51
$R_4$=value of resistor 52.

The condition in which diode 44 does not pass the input pulse when capacitor 45 changes according to Equation 1, is that the response speed of junction 43 in the positive direction must be greater than the changing rate shown in Equation 1. The response speed $dv_2/d_t$ of junction 43 in the positive direction is expressed by the following equation:

$$\frac{dv_2}{dt} = \frac{V_2-E_2}{R_2C_2} \epsilon^{-\frac{t}{C_2R_2}} \qquad (2)$$

where $E_2$=voltage of source 49
$V_2$=voltage at junction 43
$R_2$=value of resistor 48
$C_2$=value of capacitance 42.

If the values of these elements and the voltage of positive source 49 are selected such that the speed in voltage variation of junction 43 shown by Equation 2 is greater than that shown by Equation 1 within the level ordinarily employed, capacitance 45 is charged without passing the input pulse through diode 44. Similar integration operation is effected for each of the succeeding negative pulses. The charging is eventually effected corresponding to the sum of capacitances 35 and 45.

The same operation as that in the charging of the input pulse is performed in the output side for the discharging of the output pulse. Capacitor 45 is initially discharged by the negative pulse and then the charge on capacitor 35 is discharged through resistor 51 and 52. The values of these elements are selected so that they allow the voltage at junction 33 to follow such variation in voltage on capacitor 35. Further, even if both the input and output pulses are applied simultaneously and the charging and discharging are effected simultaneously, the proportionality is still kept constant and the complete integrating operation can be usually performed.

It is unnecessary to provide substantially separate resistors 51 and 52. A resistance having the sum of the two resistors can be used to perform the same integrating function. Separate provision of two resistances is planned to obtain the same change in voltage at junction 53 as the change which occurs when a capacitor having the sum of two capacitors 35 and 45 is used by assuming a relation as follows:

$$C_4R_3=C_5R_4 \qquad (3)$$

where $C_4$=value of capacitor 35
$C_5$=value of capacitor 45.

In other words, separate provision of two resistors allows to obtain the integrated values of two capacitances at one junction 53 and the voltage value obtained at junction 53 can be utilized as a control signal. Particularly, when the positive pulses having random amplitudes and occurring at random intervals are applied to terminal 31, the amplitude of signal obtained at terminal 53 will increase from its normal or original value to a certain value. Simultaneously with the application of positive pulses to terminal 31, negative pulses having a constant amplitude and occurring at a constant interval are applied to terminal 41 until the amplitude of signal obtained at terminal 53 restores to its normal value. Thus, by counting the number of the negative pulses applied, the integrated value of the positive input applied to terminal 31 can be measured precisely. Thus, in effect, the conversion of pulses having random amplitudes and occurring at random intervals to pulses having a constant amplitude and occurring at a constant interval can be attained in accordance with the invention.

Alternatively, in order to get the integrated value of the two capacitances, two voltages are taken out from two separate parts representing each of the capacitances and the integrated value is obtained at the junction of two resistors which satisfy the relation shown in Equation 3.

In accordance with the invention an extremely simplified circuit is constituted by dividing the charging capacitor of the pulse integrating circuit into two parts and connecting the two parts by a proper resistor and this simplified circuit can combine the integrating circuit for charging with the integrating circuit for discharging. The operations of said two integrating circuits do not disturb the dynamic performance shown when each of the integrating circuits operates independently and also do not interfere with each other at any timed relation so that complete integrating operations can be expected.

Further, if the point in the resistor to which two capacitances are connected is selected to satisfy the Equation 3, the integrated value of the two capacitances can be obtained from the voltage of the point and the voltage of the point can be utilized as the control signals of the combination of the two integrating circuits for charging and discharging in the similar manner as the control signal is utilized in an individual integrating circuit.

The circuit according to the invention can preferably be applied to the precise measurement of radiation pulses which have random amplitude and occur at random time interval.

While a preferred embodiment of the present invention has been disclosed, the scope of the present invention is not limited thereto and is intended to be defined by the appended claims.

I claim:

1. A pulse integrating system comprising two integrating circuits for charging and discharging respectively, each integrating circuit including an input terminal, a capacitor, a first diode connected between said input terminal and one terminal of said capacitor, and a series combination of a bias holding circuit and second diode connected in parallel with said first diode for maintaining the potential at said input terminal at the same value as that at the junction between said first diode and said capacitor, and the capacitor of one of said integrating circuits having said one terminal connected through a resistance to the first terminal of the capacitor of the other integrating circuit, said first and second diodes of each of said integrating circuits being disposed so that said integrating circuit for discharging operates complementary to said integrating circuit for charging, whereby when pulses of one polarity and having arbitrary amplitudes and occurring at arbitrary intervals are applied to one of said integrating circuits, the capacitor of said one integrating circuit is charged integratingly, and when pulses of another polarity having predetermined amplitude and repetition rate are applied to the other of said integrating circuits, the capacitor of the other integrating circuit is charged integratingly so that the capacitor of the integrating circuit for discharging is discharged.

2. A pulse integrating system according to claim 1, wherein said resistance has an intermediate tap providing a control signal, said intermediate tap being taken out from a position satisfying the relation $C_1 R_1 = C_2 R_2$ where $C_1$ and $C_2$ represent capacitors of the integrating circuits respectively and $R_1$ and $R_2$ represent the resistances of the resistor portions of said resistor divided by said tap respectively.

References Cited

UNITED STATES PATENTS

| | | | |
|---|---|---|---|
| 2,991,358 | 7/1961 | Wilcox | 328—167 |
| 3,078,408 | 2/1963 | Colter | 320—1 |
| 3,281,701 | 10/1966 | Axe | 307—233 |

DONALD D. FORRER, Primary Examiner

B. P. DAVIS, Assistant Examiner

U.S. Cl. X.R.

307—229